United States Patent
Kumar et al.

(10) Patent No.: US 7,365,998 B2
(45) Date of Patent: Apr. 29, 2008

(54) UNREGULATED ISOLATED DC/DC CONVERTER WITH RIPPLE CONTROL

(75) Inventors: Pavan Kumar, Portland, OR (US); Annabelle Pratt, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 11/241,740

(22) Filed: Sep. 30, 2005

(65) Prior Publication Data

US 2007/0076450 A1    Apr. 5, 2007

(51) Int. Cl.
*H02J 1/02*    (2006.01)
(52) U.S. Cl. .................. 363/39; 363/45; 363/46; 363/48; 363/89
(58) Field of Classification Search .............. 363/46
See application file for complete search history.

(56) References Cited

U.S. PATENT DOCUMENTS

| | | | | | |
|---|---|---|---|---|---|
| 4,594,648 | A | * | 6/1986 | Gallios | 363/46 |
| 4,872,127 | A | * | 10/1989 | Nolan | 708/3 |
| 4,891,744 | A | * | 1/1990 | Yamamoto et al. | 363/89 |
| 5,471,378 | A | * | 11/1995 | King | 363/46 |
| 5,668,464 | A | * | 9/1997 | Krein et al. | 323/259 |
| 6,489,755 | B1 | * | 12/2002 | Boudreaux et al. | 323/282 |

* cited by examiner

*Primary Examiner*—Bao Q. Vu
*Assistant Examiner*—Emily P Pham
(74) *Attorney, Agent, or Firm*—Kevin A. Reif (57) ABSTRACT

An unregulated isolated DC/DC converter is configured to receive an input signal and to provide an output signal. A ripple control circuit is coupled to the unregulated isolated DC/DC converter, wherein the ripple control circuit is configured to reduce an amount of low frequency ripple transferred to the output signal from the input signal.

6 Claims, 9 Drawing Sheets

UNREGULATED ISOLATED DC/DC CONVERTER WITH RIPPLE CONTROL

The invention relates to a power supply. More particularly, some embodiments of the invention relate to an unregulated isolated DC/DC converter with ripple control.

BACKGROUND AND RELATED ART

The problem of output regulation, including reduction of line frequency components, in an isolated power supply unit (PSU) may be handled by either a single, relatively less efficient regulated DC/DC stage, or by the use of two conversion stages, e.g. an Intermediate Bus Architecture or Factorized Power stage utilizing a highly efficient unregulated isolated DC/DC converter (also referred to as a DC transformer, hereinafter interchangeably referred to as a 'DCX') together with a regulated, non-isolated DC/DC stage (D2D) either before or after the DCX.

Although the efficiency of the DCX/D2D combination (or vice versa) may be higher than the single regulated DC/DC stage, the overall efficiency is still less than that possible with a single DCX conversion stage. One problem with utilizing a single DCX stage is the possible transfer of variations in its input voltage to its output. Another problem with utilizing a single DCX stage is the possible output voltage variation with output load variation.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
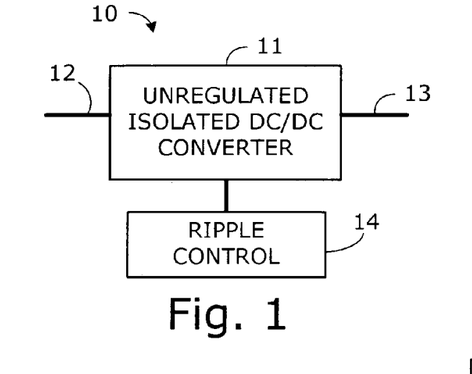
FIG. 1 is a block diagram of an unregulated isolated DC/DC converter with ripple control according to some embodiments of the invention.

With reference to FIG. 1, a power supply stage 10 includes an unregulated isolated DC/DC converter 11 configured to receive an input signal 12 and to provide an output signal 13. A ripple control circuit 14 may be coupled to the unregulated isolated DC/DC converter 11, wherein the ripple control circuit 14 is configured to reduce an amount of low frequency ripple, e.g. line frequency ripple, transferred to the output signal 13 from the input signal 12. Advantageously, some embodiments of the invention may utilize various ripple control strategies to enable use of a highly efficient unregulated isolated DC/DC converter topology in a power supply unit.

Power conversion losses may account for about 50% of the wattage utilized in some modern day data centers, resulting in reduced server density and low rack utilization. Overall the power and cooling capacity available to silicon loads for information processing may be reduced which in turn may increase the total cost of ownership (TCO) of data centers. Efficient power delivery is important to reduce power consumption, increase server density and potentially provide an increased MIPS/watt metric for server applications. Advantageously, some embodiments of the invention include a DCX with ripple control that may improve immunity for the DCX output from line and other low frequency (e.g. significantly lower than the switching frequency) input variations while providing efficiency benefits. For example, utilizing a high efficiency DCX topology, in accordance with some embodiments of the invention, in a server system may increase overall system efficiency resulting in higher rack utilization, and reduced TCO for data centers.

For example, some embodiments of the invention may involve modulating the duty cycle or switching frequency of the DCX in order to reduce or prevent low frequency ripple components from the DCX input propagating to the output.

For example, some configurations may allow the use of a highly efficient DCX with ripple control in applications where low frequency ripple is present on the input voltage. For example, according to some embodiments of the invention, a DCX with ripple control may feed forward the low frequency ripple component of the DCX input voltage, or feed back the low frequency ripple component of the DCX output voltage, to a circuit which governs the duty cycle or switching frequency of the DCX and modulate the duty cycle/switching frequency such that it reduces or eliminates the low frequency component at the DCX output.

Figure 2:
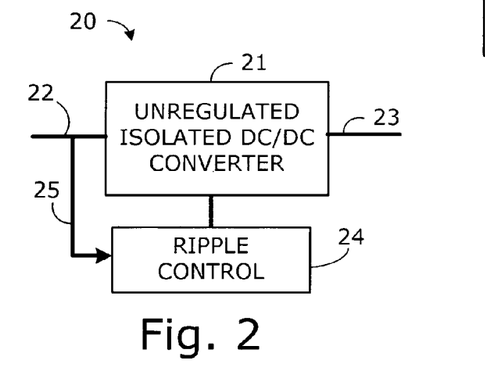
FIG. 2 is another block diagram of an unregulated isolated DC/DC converter with ripple control according to some embodiments of the invention.

With reference to FIG. 2, a power supply stage 20 includes an unregulated isolated DC/DC converter 21 configured to receive an input signal 22 and to provide an output signal 23. A ripple control circuit 24 may be coupled to the unregulated isolated DC/DC converter 21, wherein the ripple control circuit 24 is configured to reduce an amount of low frequency ripple transferred to the output signal 23 from the input signal 22. In the power supply stage 20, the ripple control circuit 24 is configured to receive a feed-forward signal 25 from the input signal 22. For example, the ripple control circuit 24 may be configured to utilize an amount of low frequency ripple present in the feed-forward signal 25 to reduce the amount of low frequency ripple transferred to the output signal 23 from the input signal 22.

Figure 3:
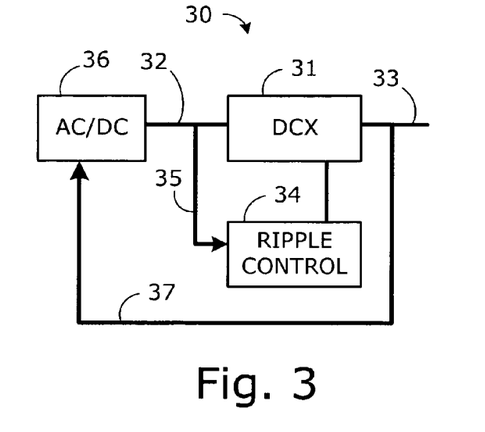
FIG. 3 is a block diagram of a system including an unregulated isolated DC/DC converter with ripple control according to some embodiments of the invention.

With reference to FIG. 3, a power supply system 30 includes an unregulated isolated DC/DC converter 31 configured to receive an input signal 32 and to provide an output signal 33. A ripple control circuit 34 is coupled to the unregulated isolated DC/DC converter 31, wherein the ripple control circuit 34 is configured to reduce an amount of low frequency ripple transferred to the output signal 33 from the input signal 32. In the power supply system 30, the ripple control circuit 34 may be configured to receive a feed-forward signal 35 from the input signal 32. For example, the ripple control circuit 34 may be configured to utilize an amount of low frequency ripple present in the feed-forward signal 35 to reduce the amount of low frequency ripple transferred to the output signal 33 from the input signal 32. The power supply system 30 further includes an AC/DC converter 36 configured to provide the input signal 32 to the unregulated isolated DC/DC converter 31, wherein the AC/DC converter 36 is configured to receive a feedback signal 37 from the output signal 33 of the unregulated isolated DC/DC converter 31 and to adjust the input signal 32 to the unregulated isolated DC/DC converter 31 in accordance with the feedback signal 37 to reduce effects of load variation.

Figure 4:
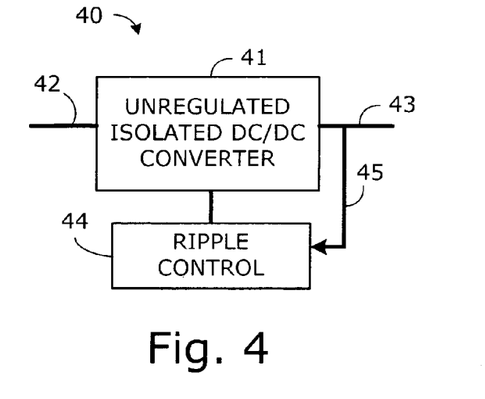
FIG. 4 is another block diagram of an unregulated isolated DC/DC converter with ripple control according to some embodiments of the invention.

With reference to FIG. 4, a power supply stage 40 includes an unregulated isolated DC/DC converter 41 configured to receive an input signal 42 and to provide an output signal 43. A ripple control circuit 44 is coupled to the unregulated isolated DC/DC converter 41, wherein the ripple control circuit 44 is configured to reduce an amount of low frequency ripple transferred to the output signal 43 from the input signal 42. In the power supply stage 40, the ripple control circuit 44 is configured to receive a feedback signal 45 from the output signal 43. For example, the ripple control circuit 44 may be configured to utilize an amount of low frequency ripple present in the feedback signal 45 to reduce the amount of low frequency ripple transferred to the output signal 43 from the input signal 42. In some embodiments, it may be desirable to further use the feedback signal 45 from the output signal 43 of the DCX 41 to control an AC/DC converter (e.g. the converter which provides the input signal 42) such that the AC/DC converter may adjust the input signal 42 of the DCX 41 when the output signal changes so as to reduce any effect the load variation may have on the DCX output signal 43.

Figure 5:
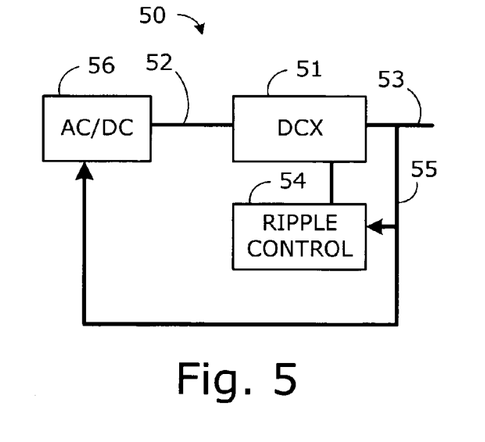
FIG. 5 is another block diagram of a system including an unregulated isolated DC/DC converter with ripple control according to some embodiments of the invention.

With reference to FIG. 5, a power supply system 50 includes an unregulated isolated DC/DC converter 51 configured to receive an input signal 52 and to provide an output signal 53. A ripple control circuit 54 is coupled to the unregulated isolated DC/DC converter 51, wherein the ripple control circuit 54 is configured to reduce an amount of low frequency ripple transferred to the output signal 53 from the input signal 52. In the power supply system 50, the ripple control circuit 54 is configured to receive a feedback signal 55 from the output signal 53. For example, the ripple control circuit 54 may be configured to utilize an amount of low frequency ripple present in the feedback signal 55 to reduce the amount of low frequency ripple transferred to the output signal 53 from the input signal 52. The power supply system 50 further includes an AC/DC converter 56 configured to provide the input signal 52 to the unregulated isolated DC/DC converter 51, wherein the AC/DC converter 56 is configured to receive the feedback signal 55 from the output signal 53 of the unregulated isolated DC/DC converter 51 and to adjust the input signal 52 to the unregulated isolated DC/DC converter 51 in accordance with the feedback signal 55 to reduce effects of load variation.

Figure 6:
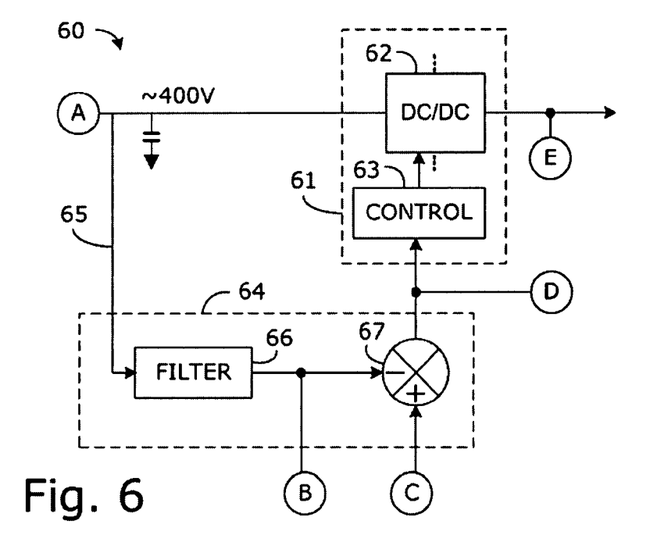
FIG. 6 is another block diagram of an unregulated isolated DC/DC converter with ripple control according to some embodiments of the invention.

With reference to FIG. 6, a power supply stage 60 includes a DCX 61 receiving an input signal A and providing an output signal E. A ripple control circuit 64 is coupled to the DCX 61, wherein the ripple control circuit 64 is configured to reduce an amount of low frequency ripple transferred to the output signal E from the input signal A. In the power supply stage 60, the ripple control circuit 64 receives a feed-forward signal 65 from the input signal A. For example, the ripple control circuit 64 may utilize an amount of low frequency ripple present in the feed-forward signal 65 to reduce the amount of low frequency ripple transferred to the output signal E from the input signal A.

In the power supply stage 60, the ripple control circuit 64 may include a filter circuit 66 coupled to the input signal A and configured to pass a filtered signal B having a low frequency ripple component. The circuit 64 may further include a summing circuit 67 coupled between the filter circuit 66 and the DCX 61. For example, the summing circuit 67 may be configured to subtract the filtered signal B from a reference signal C and provide a resulting control signal D to the DCX 61. The DCX 61 may include a DC/DC circuit 62 and a modulation control circuit 63 coupled between the ripple control circuit 64 and the DC/DC circuit 62. For example, the DCX 61 may be configured to utilize the resulting control signal D to modulate a duty cycle or switching frequency of the DC/DC circuit 62 to reduce an amount of low frequency ripple transferred to the output signal E from the input signal A. Advantageously, in some embodiments, the required change in duty cycle/switching frequency is small, so it is possible to provide relatively high efficiency.

Figure 6A:
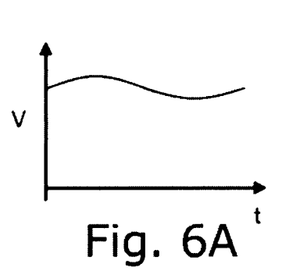
FIGS. 6A-6E are graphs of representative waveforms in accordance with some embodiments of the invention.

With reference to FIG. 6A, the input signal A to the DCX may be a regulated DC voltage (e.g. about 400 volts) with a given low frequency ripple (e.g. a combination of AC line frequency and/or multiples of AC line frequencies). The low frequency ripple frequency may generally be at least an order of magnitude lower than the typical switching frequency of the DCX.

Figure 6B:
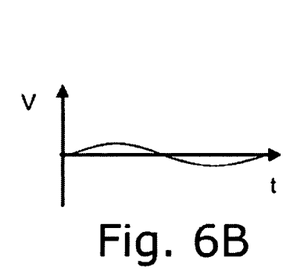

With reference to FIG. 6B, to reduce low frequency ripple on the output voltage, the low frequency ripple is decoupled from the DC voltage by filtering the input voltage. For example, the filter circuit 66 can be implemented by a simple high pass filter with a corner frequency below the low ripple frequency value. In some embodiments, a band pass filter may be recommended to filter out higher frequency noise, such as switching frequency components.

Figure 6C:
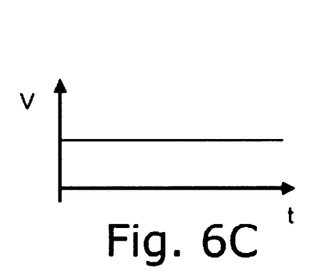
Figure 6D:
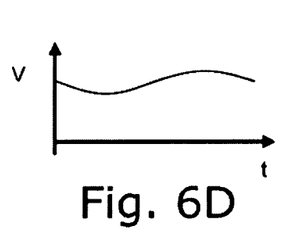

With reference to FIG. 6C, the reference signal C may be a fixed control voltage. With reference to FIG. 6D, the low frequency AC signal derived from the filter is then subtracted from the fixed control voltage, providing the resulting control signal D. In some embodiments, the filtered signal B may be subtracted from the reference signal C. Note that in the case of a converter with a non-linear input-output relationship, which may generally be the case for frequency modulated converters, the filtered low frequency AC ripple component may need to be processed further before addition to or subtraction from the fixed control voltage. The nominal duty cycle/switching frequency of the DCX is generally set at a given value as determined by various factors including turns ratio of the transformer, input voltage potential and the required output voltage level.

Figure 6E:
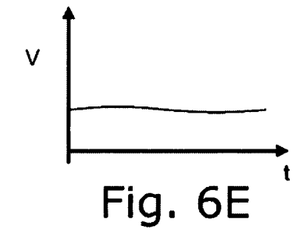

With reference to FIG. 6E, the resulting control signal D (e.g. representing a desired duty cycle or switching frequency variation) would modulate the duty cycle or switching frequency of the DCX converter such that the low frequency input voltage variations are compensated (e.g. reduced or eliminated) at the output. In other words, the input low frequency ripple is fed-forward to the DCX control signal in phase opposition so that the low frequency ripple is canceled at its output.

Advantageously, the DCX with ripple control stage may be relatively high efficiency because the duty cycle/switching frequency variation due to the ripple feed-forward/feedback may be small (since the ripple magnitude is only a small portion of the input voltage magnitude). For example, so-called lossless schemes such as zero voltage switching (ZVS) and/or zero current switching (ZCS) may be utilized. To the extent necessary for a particular application, output voltage regulation may be implemented in alternate ways without substantially affecting the DCX operation. Thus highly efficient power conversion stages can be designed using a combination of ripple feed-forward (or feedback) and DCX stages. The DCX stages can have any of a variety of topologies including, without limitation, a forward converter, push-pull, flyback, half bridge, and/or full bridge converters.

Figure 7:
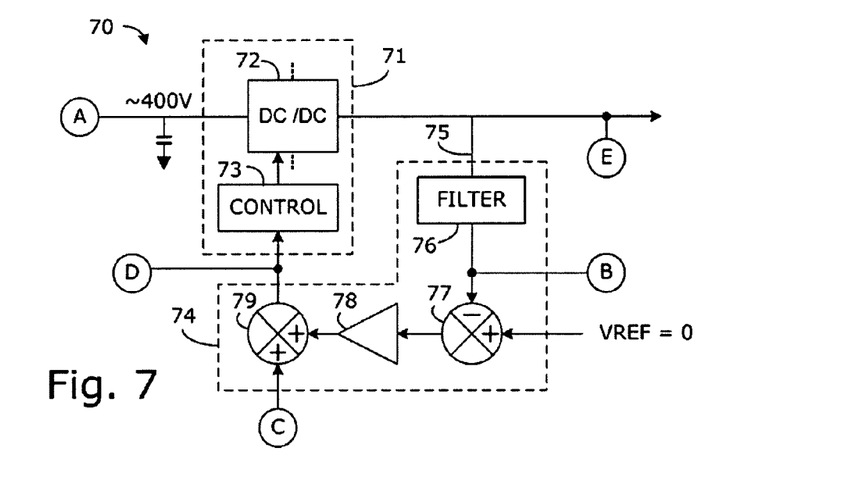
FIG. 7 is another block diagram of an unregulated isolated DC/DC converter with ripple control according to some embodiments of the invention.

With reference to FIG. 7, a power supply stage 70 includes a DCX 71 receiving an input signal A and providing an output signal E. A ripple control circuit 74 is coupled to the DCX 71, wherein the ripple control circuit 74 is configured to reduce an amount of low frequency ripple transferred to the output signal E from the input signal A. In the power supply stage 70, the ripple control circuit 74 receives a feedback signal 75 from the output signal E. For example, the ripple control circuit 74 may utilize an amount of low frequency ripple present in the feedback signal 75 to reduce the amount of low frequency ripple transferred to the output signal E from the input signal A.

In the power supply stage 70, the ripple control circuit 74 may include a filter circuit 76 coupled to the output signal E. The filter circuit 76 may be configured to pass a filtered signal B having a low frequency ripple component. The circuit 74 may further include a first summing circuit 77 coupled to receive the filtered signal B from the filter circuit 76 and configured to subtract the filtered signal B from a first reference signal (i.e. VREF=0) and provide an intermediate signal. The circuit 74 may further include a compensator circuit 78 coupled to receive the intermediate signal and configured to regulate a low frequency AC ripple content in the intermediate signal and provide a compensated signal.

The circuit 74 may further include a second summing circuit 79 coupled between the compensator circuit 78 and the DCX 71 and configured to add the compensated signal to a second reference signal C and provide a resulting control signal D to the DCX 71.

The DCX 71 may include a DC/DC circuit 72 and a modulation control circuit 73 coupled between the ripple control circuit 74 and the DC/DC circuit 72. For example, the DCX 71 may be configured to utilize the resulting control signal D to modulate a duty cycle or switching frequency of the DC/DC circuit 72 to reduce an amount of low frequency ripple transferred to the output signal E from the input signal A.

Figure 7A:
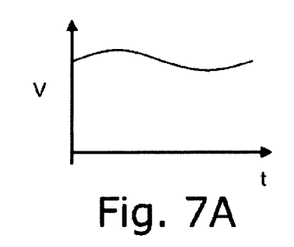
FIGS. 7A-7E are graphs of representative waveforms in accordance with some embodiments of the invention.

With reference to FIG. 7A, the input signal A to the DCX may be a regulated DC voltage (e.g. about 400 volts) with a given low frequency ripple (e.g. a combination of AC line frequency and/or multiples of AC line frequencies). The low frequency ripple frequency may generally be at least an order of magnitude lower than the typical switching frequency of the DCX.

Figure 7B:
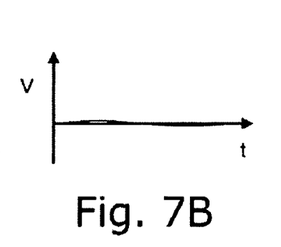

With reference to FIG. 7B, to reduce low frequency ripple on the output voltage, the low frequency ripple is decoupled from the DC voltage by filtering the output voltage. For example, the filter circuit 76 can be implemented by a simple high pass filter with a corner frequency below the low ripple frequency value. In some embodiments, a band pass filter may be recommended to filter out higher frequency noise, such as switching frequency components. In the feedback case, a compensator may be utilized to regulate out the low frequency AC ripple content in the output voltage.

Figure 7C:
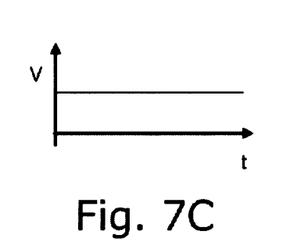
Figure 7D:
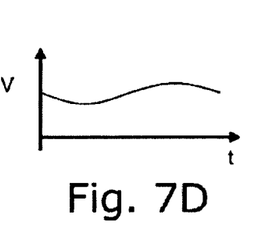

With reference to FIG. 7C, the reference signal C may be a fixed control voltage. With reference to FIG. 7D, the compensated signal is then added to the fixed control voltage, providing the resulting control signal D. In some embodiments, the various signals may be added instead of subtracted. The nominal duty cycle/switching frequency of the DCX is generally set at a given value as determined by various factors including turns ratio of the transformer, input voltage potential and the required output voltage level.

Figure 7E:
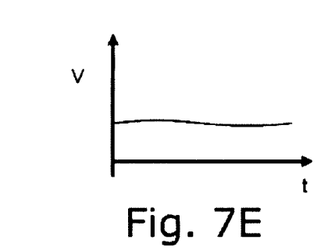

With reference to FIG. 7E, the resulting control signal D (e.g. representing a desired duty cycle or switching frequency variation) would modulate the duty cycle or the switching frequency of the DCX converter such that the low frequency input voltage variations are compensated (e.g. reduced or eliminated) at the output.

Figure 8:
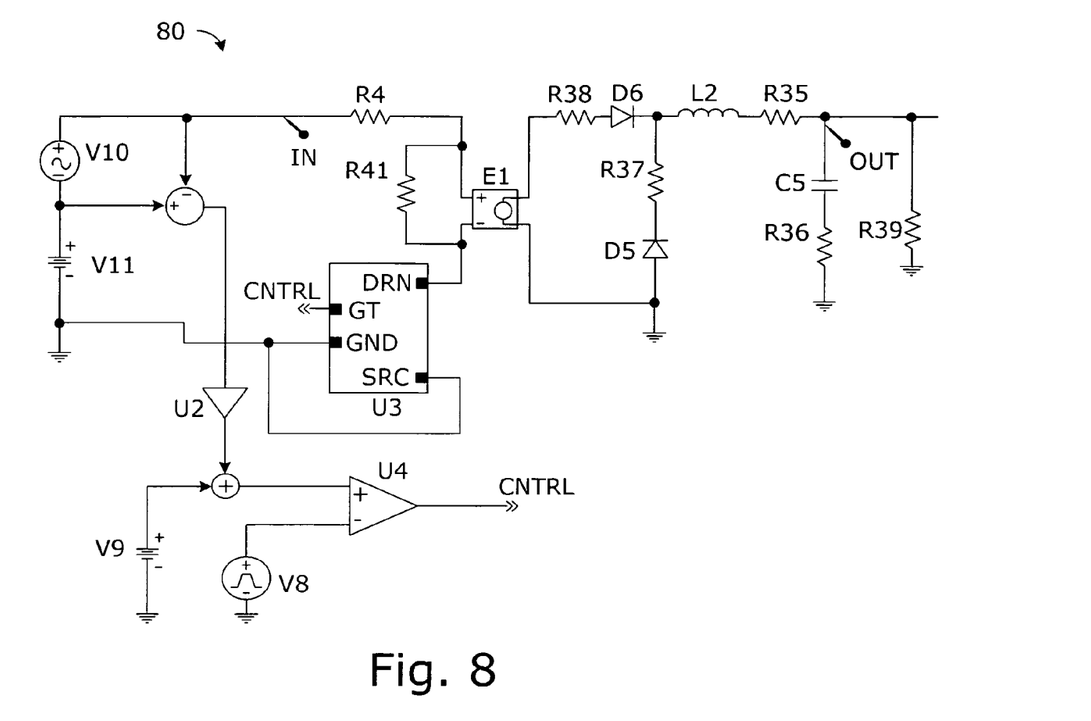
FIG. 8 is a schematic diagram of a simulated circuit in accordance with some embodiments of the invention.

With reference to FIG. 8, a simulation model of a power supply unit 80 includes the following components:

| REFERENCE LABEL | DESCRIPTION |
| --- | --- |
| E1 | Voltage controlled voltage source, which models a Transformer, e.g. nominal gain of 0.0845 |
| U2 | Gain Element, e.g. nominal gain of 11.63E−03 |
| U3 | Switch circuit, e.g. a transistor |
| U4 | Comparator, e.g. an opamp |
| V8 | Waveform Generator |
| V9 | Voltage source, e.g. a 5 V DC Battery |
| V10 | Sine wave generator |
| V11 | Voltage source, e.g. a nominal 400 V DC source |
| R4, R35, R36, R37, R38, R39 | Resistor, e.g. a 1 mohm resistor |
| R39 | Resistor, e.g. a 0.5 ohm resistor |
| R41 | Resistor, e.g. a 10 kohm resistor |
| C5 | Capacitor, e.g. a 1000 uF capacitor |
| D5, D6 | Diode |
| L2 | Inductor, e.g. a 100 uH inductor |

For simulation purposes, the input voltage to the DCX, implemented with a forward converter topology in FIG. 8, is the sum of a 400V DC source V11 and a 120 Hz sine wave generator V10 with an amplitude of 25V. The comparator U4 provides duty cycle modulation to the forward converter by providing the control signal CNTRL to the gate of the switch U3. For example, the waveform generator V8 may generate a sawtooth waveform which varies between 0V and 10V with a period of 10 usec. A component of the input voltage is fed-forward to the comparator U4 where it is compared to the sawtooth waveform to generate the control signal CNTRL.

Figure 9:
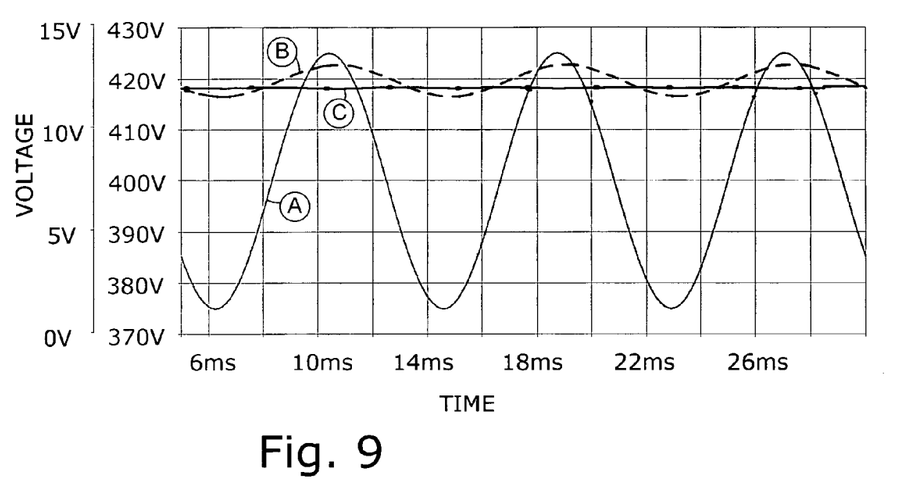
FIG. 9 is a graph of representative simulation results in accordance with some embodiments of the invention.

With reference to FIG. 9, the signal A represents the DC bus voltage (on the scale of 370V-430V), for example, taken at the simulation probe point labeled IN from FIG. 8. Without feed-forward of the low frequency ripple component, the converter operates at a fixed duty cycle, (e.g. simulated with only the fixed voltage V9 provided to the positive terminal of the comparator U4), and the low frequency ripple is propagated to the output. Signal B represents the simulation results for the output voltage (on the scale of 0V to 15V) taken from the simulation probe point labeled OUT in FIG. 8, without feed-forward of the low frequency ripple component. Advantageously, with low frequency ripple feed-forward in accordance with some embodiments of the present invention, the duty cycle varies and the low frequency ripple contents may be reduced at the output. Signal C represents the simulation results for output voltage (on the scale of 0V to 15V) taken from the simulation probe point labeled OUT in FIG. 8, with feed-forward of the low frequency ripple component. As can be seen from the simulation results, an amount of low frequency ripple transferred to the output signal C from the input signal A (e.g. with the feed-forward of the low frequency ripple component) is reduced as compared to the amount of low frequency ripple transferred to the output signal B from the input signal A (e.g. with no feed-forward of the low frequency ripple component).

Figure 10:
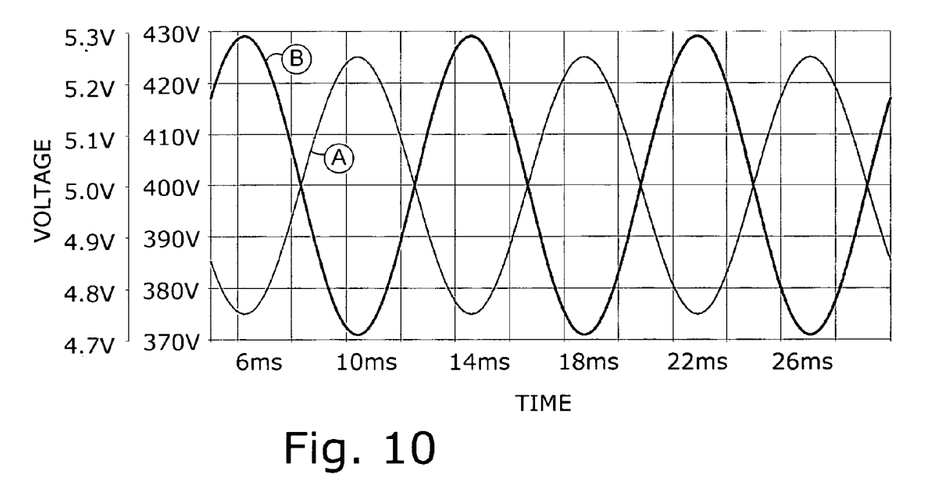
FIG. 10 is another graph of representative simulation results in accordance with some embodiments of the invention.

With reference to FIG. 10, the signal A again represents the DC bus voltage (on the scale of 370V to 430V), for example, taken at the simulation probe point labeled IN from FIG. 8. The signal B represents the control signal CNTRL (on the scale of 4.7V to 5.3V) with the feed-forward of the low frequency ripple component. As can be seen from FIG. 10, the control signal CNTRL is substantially in phase opposition to the low frequency ripple component of the input signal. The control signal varies by a small amount, for example 0.6V peak-to-peak compared to 5V fixed control voltage, so a high efficiency may be expected from the converter.

In the above and other examples described herein, varying the duty cycle and/or switching frequency are noted as example techniques to control the DCX. However, various embodiments of the invention are not limited to these techniques. For example, those skilled in the art will appreciate that a phase shifted full bridge implementation may be utilized to adjust the phase. Also, for an implementation utilizing discrete pulse modulation, the number of on pulses versus off pulses in a given period of time may be utilized to adjust the output.

Figure 11:
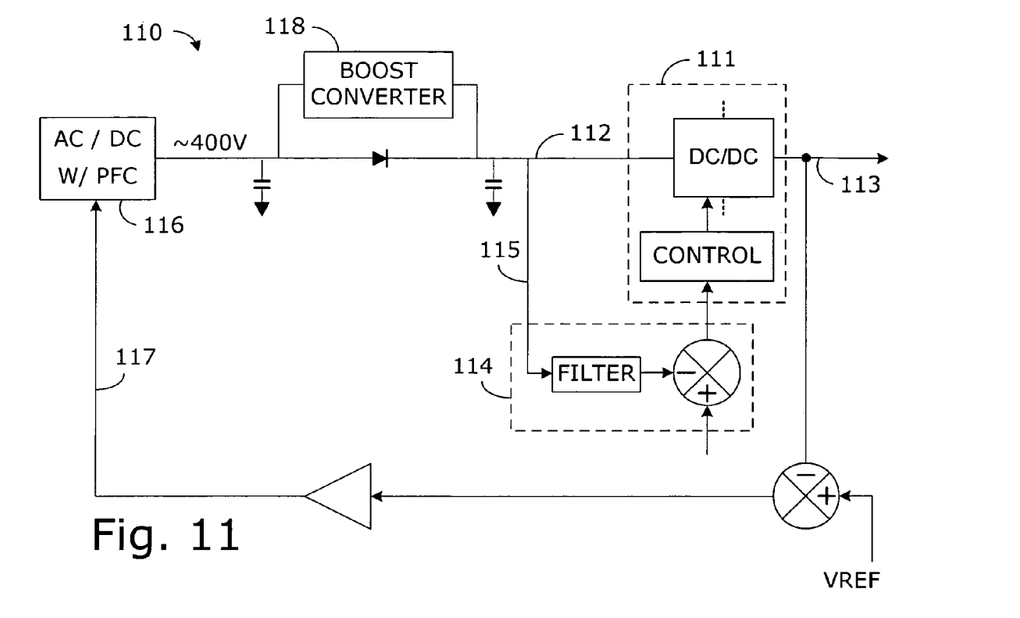
FIG. 11 is a block diagram of a system including an unregulated isolated DC/DC converter with ripple control according to some embodiments of the invention.

With reference to FIG. 11, a power supply system 110 includes a DCX 111 receiving an input signal 112 and providing an output signal 113. A ripple control circuit 114 is coupled to the DCX 111, wherein the ripple control circuit 114 is configured to reduce an amount of low frequency ripple transferred to the output signal 113 from the input signal 112. In the power supply system 110, the ripple control circuit 114 receives a feed-forward signal 115 from the input signal 112. For example, the ripple control circuit 114 may utilize an amount of low frequency ripple present in the feed-forward signal 115 to reduce the amount of low frequency ripple transferred to the output signal 113 from the input signal 112.

The power supply system 110 further includes an AC/DC converter 116 (e.g. with power factor correction (PFC)) providing the input signal 112 to the DCX 111, wherein the AC/DC converter 116 receives a feedback signal 117 from the output signal 113 of the DCX 111 and adjusts the input signal 112 to the unregulated isolated DC/DC converter 111 in accordance with the feedback signal 117 to reduce effects of load variation. Advantageously, feeding back the output voltage of the DCX 111 to the AC/DC may reduce or mitigate the effects of load variation on the DCX output voltage.

The power supply system 110 further includes a boost converter 118 connected in parallel with a diode coupled to the input signal 112. For example, the boost converter 118 may provide a regulated input to the DCX during an AC line outage, while the diode conducts during normal operation. This arrangement has been shown effective to extend hold-up time. For example, the boost converter may only be operational under an AC line outage condition to provide a regulated input to the unregulated isolated DC/DC converter, thereby reducing the variations in DCX output as a result of the AC line outage. An example of a Hold-up Time Extension Circuit is described in U.S. Pat. No. 6,504,497. In some embodiments of the invention, good regulation of the output voltage is achieved under normal operation with the AC/DC converter 116, with control based on feedback from the output voltage, and under line outage events by utilizing the boost converter 118.

Figure 12:
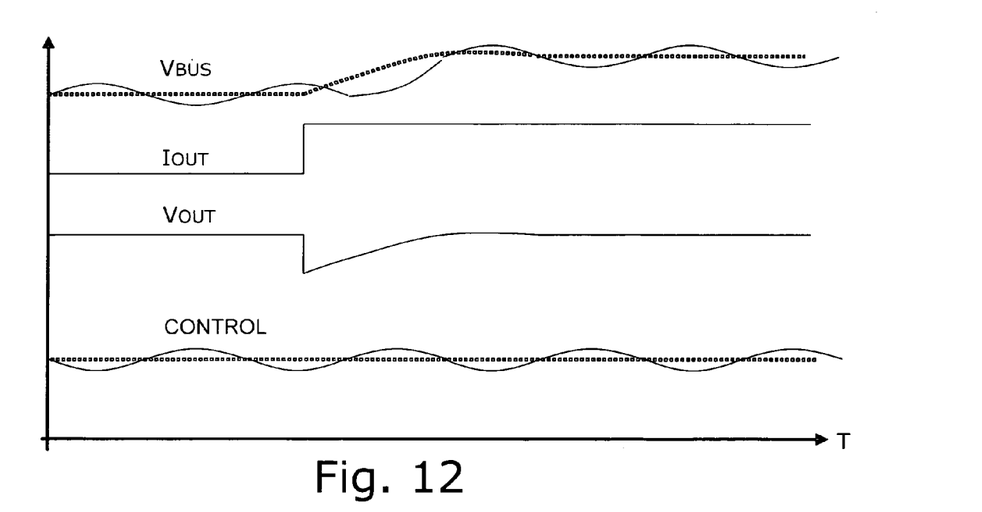
FIG. 12 is a graph of representative waveforms in accordance with some embodiments of the invention.

With reference to FIG. 12, representative waveforms during a load step are shown for the power supply system 111 from FIG. 11. The illustrated signals are the DCX input voltage V-BUS, the DCX output current I-OUT and voltage V-OUT and the DCX control signal CONTROL. Because the DCX input voltage may be varied by the AC/DC converter as the load varies, the duty cycle/switching frequency variation may remain small, allowing the efficiency benefits of the DCX to be substantially maintained, along with the output regulation function during normal and AC line loss conditions. The amount of low frequency ripple component transferred to the output voltage from the input voltage may be reduced or eliminated by the ripple feed-forward as shown. Advantageously, the combination of features in the power supply system 11 can result in very high PSU efficiencies, in some embodiments.

Figure 13:
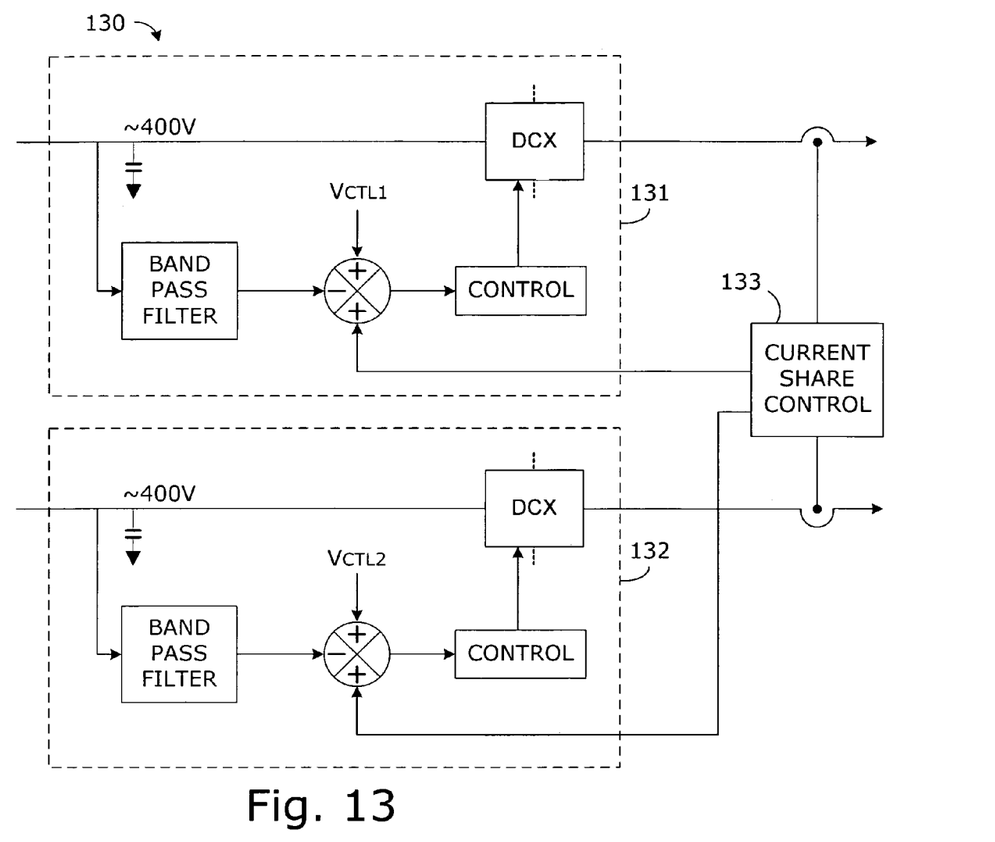
FIG. 13 is a block diagram of another system including an unregulated isolated DC/DC converter with ripple control according to some embodiments of the invention.

With reference to FIG. 13, a power supply system 130 includes a first DCX with ripple control 131 and a second DCX with ripple control 132. A current share control circuit 133 is coupled between respective outputs of the DCX circuits 131 and 132. The current share control circuit 133 provides respective feedback signals to each of the DCX circuits 131 and 132. For example, the current share control circuit 133 may provide a feedback signal to the summing circuit which is coupled between the filter circuit and the DCX.

In some embodiments of the invention, utilizing the output voltage feedback may provide good regulation of the nominal output voltage under steady state conditions, for example because the output voltage is a function of the efficiency of the DCX. As noted above, in some embodiments the ripple control circuit may have the ability to make modifications to the duty cycle/switching frequency of the DCX. According to some embodiments, configuring the ripple control circuit (or other circuit in the PSU) to further add a small DC offset may allow for better current sharing between converters (e.g. as shown in FIG. 13). Because the DCX is highly efficient, only small variation in current may be expected, so high efficiency can be maintained. An appropriately configured current sharing controller may reduce or minimize the adjustments required on the DCX control signal, thereby improving efficiency.

Figure 14:
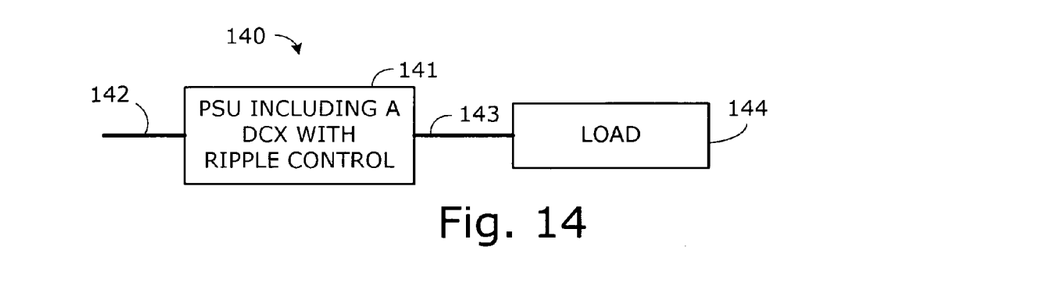
FIG. 14 is a block diagram of another system including an unregulated isolated DC/DC converter with ripple control according to some embodiments of the invention.

With reference to FIG. 14, a system 140 includes a PSU 141 including a DCX with ripple control. The PSU 141 may receive and input signal 142 and provide an output signal 143 to a connected load 144. For example, the connected load 144 may include an electronic component such as a processor. For example, the power supply unit 141 may include one or more the features described herein.

For example, the power supply unit 141 may include an unregulated isolated DC/DC converter receiving an input signal and providing an output signal for the power supply unit, and a ripple control circuit coupled to the unregulated isolated DC/DC converter, wherein the ripple control circuit is configured to reduce an amount of low frequency ripple transferred to the output signal from the input signal. The load 144 may be connected to the output signal of the power supply unit 141.

In some embodiments of the system 140, the ripple control circuit may receive a feed-forward signal from the input signal to the unregulated isolated DC/DC converter. The ripple control circuit may utilize an amount of low frequency ripple present in the feed-forward signal to reduce the amount of low frequency ripple transferred to the output signal from the input signal. The power supply unit 141 may further include an AC/DC converter providing the input signal to the unregulated isolated DC/DC converter, wherein the AC/DC converter receives a feedback signal from the output signal of the unregulated isolated DC/DC converter and adjusts the input signal to the unregulated isolated DC/DC converter in accordance with the feedback signal to reduce effects of load variation.

In some embodiments of the system 140, the ripple control circuit may include a filter circuit coupled to the input signal and configured to pass a filtered signal having a low frequency ripple component, and a summing circuit coupled between the filter circuit and the unregulated isolated DC/DC converter and configured to subtract the filtered signal from a reference signal and provide a resulting control signal to the unregulated isolated DC/DC converter. For example, the unregulated isolated DC/DC converter may be configured to utilize the resulting control signal to modulate a duty cycle or switching frequency of the unregulated isolated DC/DC converter to reduce an amount of low frequency ripple transferred to the output signal from the input signal.

In some embodiments of the system 140, the ripple control circuit may receive a feedback signal from the output signal. The ripple control circuit may utilize an amount of low frequency ripple present in the feedback signal to reduce the amount of low frequency ripple transferred to the output signal from the input signal. The power supply unit 141 may further include an AC/DC converter providing the input signal to the unregulated isolated DC/DC converter, wherein the AC/DC converter receives the feedback signal from the output signal of the unregulated isolated DC/DC converter and adjusts the input signal to the unregulated isolated DC/DC converter in accordance with the feedback signal to reduce effects of load variation.

In some embodiments of the system 140, the ripple control circuit may include a filter circuit coupled to the output signal and configured to pass a filtered signal having a low frequency ripple component, a first summing circuit coupled to receive the filtered signal from the filter circuit and configured to subtract the filtered signal from a first reference signal and provide an intermediate signal, a compensator circuit coupled to receive the intermediate signal and configured to regulate a low frequency AC ripple content in the intermediate signal and provide a compensated signal, and a second summing circuit coupled between the compensator circuit and the unregulated isolated DC/DC converter and configured to add the compensated signal to a second reference signal and provide a resulting control signal to the unregulated isolated DC/DC converter. For example, the unregulated isolated DC/DC converter may be configured to utilize the resulting control signal to modulate a duty cycle or switching frequency of the unregulated isolated DC/DC converter to reduce an amount of low frequency ripple transferred to the output signal from the input signal.

In some embodiments of the system 140, the power supply unit 141 further include a second unregulated isolated DC/DC converter receiving a second input signal and providing a second output signal for the power supply unit, a second ripple control circuit coupled to the second unregulated isolated DC/DC converter, wherein the second ripple control circuit is configured to reduce an amount of low frequency ripple transferred to the second output signal from the second input signal, and a current share control circuit coupled between the two unregulated isolated DC/DC converters.

Figure 15:
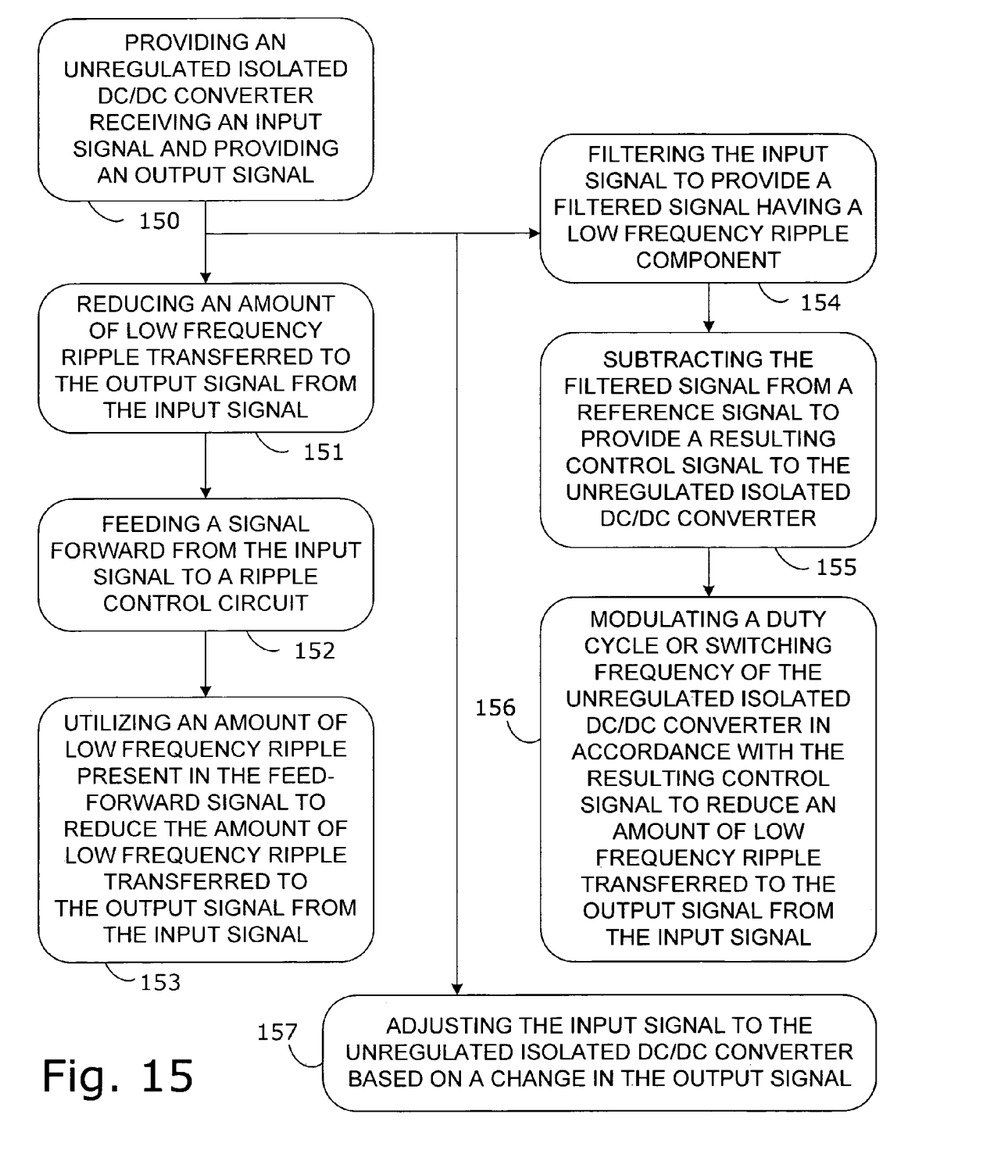
FIG. 15 is a flow diagram in accordance with some embodiments of the invention.

With reference to FIG. 15, some embodiments of the invention may involve providing an unregulated isolated DC/DC converter receiving an input signal and providing an output signal (e.g. at block 150), and reducing an amount of low frequency ripple transferred to the output signal from the input signal (e.g. at block 151). Some embodiments may further involve feeding a signal forward from the input signal to a ripple control circuit (e.g. at block 152). Some embodiments may further involve utilizing an amount of low frequency ripple present in the feed-forward signal to reduce the amount of low frequency ripple transferred to the output signal from the input signal (e.g. at block 153).

Some embodiments may further involve filtering the input signal to provide a filtered signal having a low frequency ripple component (eg. at block 154), and subtracting the filtered signal from a reference signal to provide a resulting control signal to the unregulated isolated DC/DC converter (e.g. at block 155). Some embodiments may further involve modulating a duty cycle or switching frequency of the unregulated isolated DC/DC converter in accordance with the resulting control signal to reduce an amount of low frequency ripple transferred to the output signal from the input signal (e.g. at block 156).

Some embodiments may further involve adjusting the input signal to the unregulated isolated DC/DC converter based on a change in the output signal (e.g. at block 157).

Figure 16:
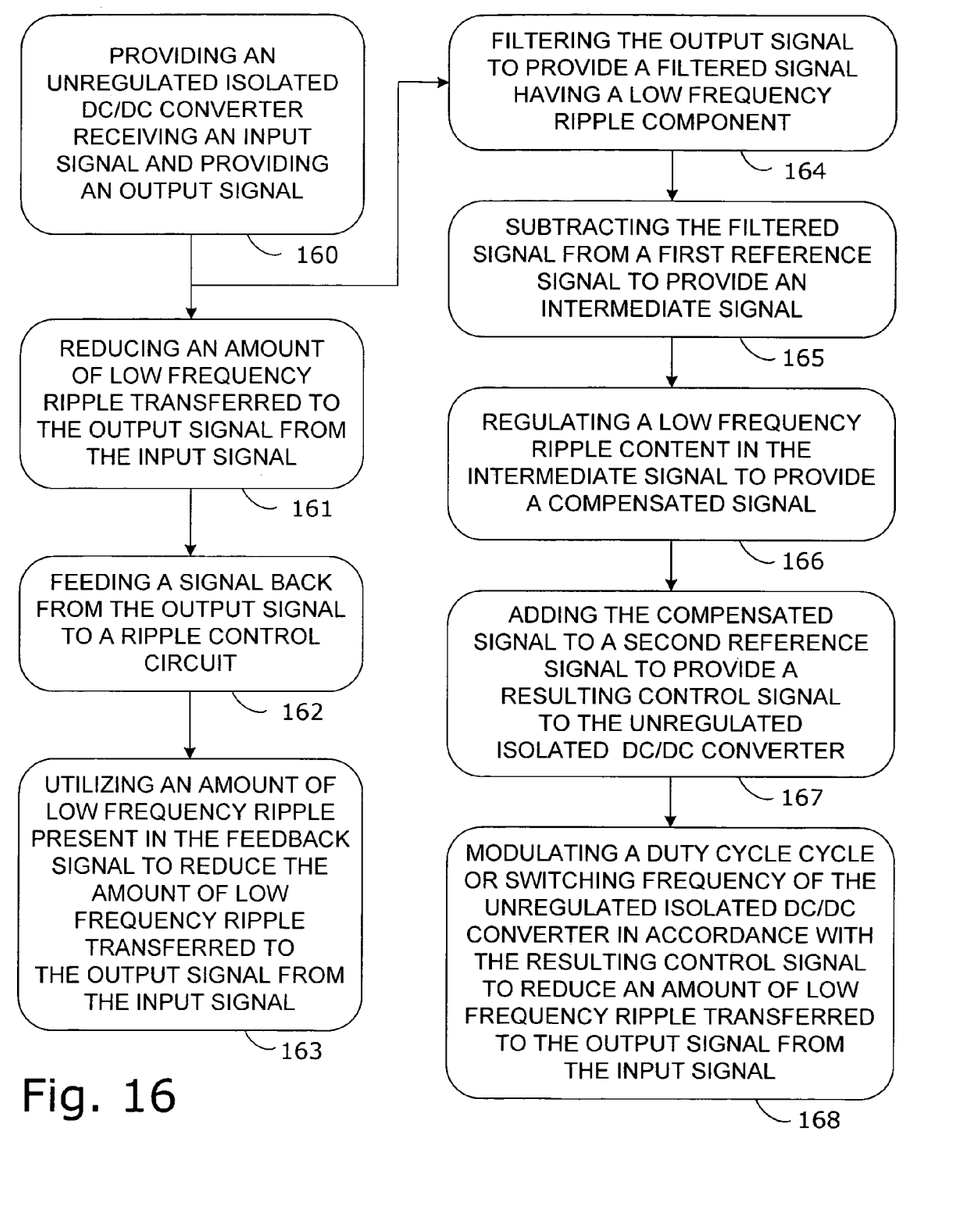
FIG. 16 is another flow diagram in accordance with some embodiments of the invention.

With reference to FIG. 16, some embodiments of the invention may involve providing an unregulated isolated DC/DC converter receiving an input signal and providing an output signal (e.g. at block 160), and reducing an amount of low frequency ripple transferred to the output signal from the input signal (e.g. at block 161). Some embodiments may further involve feeding a signal back from the output signal to a ripple control circuit (e.g. at block 162). Some embodiments may further involve utilizing an amount of low frequency ripple present in the feedback signal to reduce the amount of low frequency ripple transferred to the output signal from the input signal (e.g. at block 163).

Some embodiments may further involve filtering the output signal to provide a filtered signal having a low frequency ripple component (e.g. at block 164), subtracting the filtered signal from a first reference signal to provide an intermediate signal (e.g. at block 165), regulating a low frequency AC ripple content in the intermediate signal to provide a compensated signal (e.g. at block 166), and adding the compensated signal to a second reference signal to provide a resulting control signal to the unregulated isolated DC/DC converter (e.g. at block 167). Some embodiments may further involve modulating a duty cycle or switching frequency of the unregulated isolated DC/DC converter in accordance with the resulting control signal to reduce an amount of low frequency ripple transferred to the output signal from the input signal (e.g. at block 168).

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. An apparatus, comprising:
   an unregulated isolated DC/DC converter configured to receive an input signal and to provide an output signal; and
   a ripple control circuit coupled to the unregulated isolated DC/DC converter, wherein the ripple control circuit is configured to reduce an amount of low frequency ripple transferred to the output signal from the input signal, wherein the ripple control circuit comprises:
   a filter circuit coupled to the output signal and configured to pass a filtered signal having a low frequency ripple component;
   a first summing circuit coupled to receive the filtered signal from the filter circuit and configured to subtract the filtered signal from a first reference signal and provide an intermediate signal;
   a compensator circuit coupled to receive the intermediate signal and configured to regulate a low frequency AC ripple content in the intermediate signal and provide a compensated signal; and
   a second summing circuit coupled between the compensator circuit and the unregulated isolated DC/DC converter and configured to add the compensated signal to a second reference signal and provide a resulting control signal to the unregulated isolated DC/DC converter.

2. The apparatus of claim 1, wherein the unregulated isolated DC/DC converter is configured to utilize the resulting control signal to modulate a duty cycle or switching frequency of the unregulated isolated DC/DC converter to reduce an amount of low frequency ripple transferred to the output signal from the input signal.

3. A system, comprising:
   a power supply unit, the power supply unit including:
   an unregulated isolated DC/DC converter configured to receive an input signal and to provide an output signal for the power supply unit; and
   a ripple control circuit coupled to the unregulated isolated DC/DC converter, wherein the ripple control circuit is configured to reduce an amount of low frequency ripple transferred to the output signal from the input signal; and
   a load connected to the output signal of the power supply unit,
   wherein the ripple control circuit is configured to receive a feed-forward signal from the input signal,
   wherein the ripple control circuit is configured to utilize an amount of low frequency ripple present in the feed-forward signal to reduce the amount of low frequency ripple transferred to the output signal from the input signal,
   wherein the power supply unit further comprises:
   an AC/DC converter configured to provide the input signal to the unregulated isolated DC/DC converter, wherein the AC/DC converter is configured to receive a feedback signal from the output signal of the unregulated isolated DC/DC converter and to adjust the input signal to the unregulated isolated DC/DC converter in accordance with the feedback signal to reduce effects of load variation, wherein the power supply unit further comprises:
   a boost converter connected in parallel with a diode, coupled between the AC/DC converter and the unregulated isolated DC/DC converter, wherein the boost converter is operational under a line outage condition to provide a regulated input to the unregulated isolated DC/DC converter.

4. A system, comprising:
   a power supply unit, the power supply unit including:
   an unregulated isolated DC/DC converter configured to receive an input signal and to provide an output signal for the power supply unit; and
   a ripple control circuit coupled to the unregulated isolated DC/DC converter, wherein the ripple control circuit is configured to reduce an amount of low frequency ripple transferred to the output signal from the input signal; and
   a load connected to the output signal of the power supply unit,
   wherein the ripple control circuit is configured to receive a feedback signal from the output signal,
   wherein the ripple control circuit is configured to utilize an amount of low frequency ripple present in the feedback signal to reduce the amount of low frequency ripple transferred to the output signal from the input signal, wherein the power supply unit further comprises:
   an AC/DC converter configured to provide the input signal to the unregulated isolated DC/DC converter, wherein the AC/DC converter is configured to receive the feedback signal from the output signal of the unregulated isolated DC/DC converter and to adjust the input signal to the unregulated isolated DC/DC converter in accordance with the feedback signal to reduce effects of load variation,
   wherein the power supply unit further comprises:
   a boost converter connected in parallel with a diode, coupled between the AC/DC converter and the unregulated isolated DC/DC converter, wherein the boost converter is operational under a line outage condition to provide a regulated input to the unregulated isolated DC/DC converter.

5. A system, comprising:
a power supply unit, the power supply unit including:
- an unregulated isolated DC/DC converter configured to receive an input signal and to provide an output signal for the power supply unit; and
- a ripple control circuit coupled to the unregulated isolated DC/DC converter, wherein the ripple control circuit is configured to reduce an amount of low frequency ripple transferred to the output signal from the input signal; and a load connected to the output signal of the power supply unit, wherein the ripple control circuit comprises:

a filter circuit coupled to the output signal and configured to pass a filtered signal having a low frequency ripple component;

a first summing circuit coupled to receive the filtered signal from the filter circuit and configured to subtract the filtered signal from a first reference signal and provide an intermediate signal;

a compensator circuit coupled to receive the intermediate signal and configured to regulate a low frequency AC ripple content in the intermediate signal and provide a compensated signal; and a second summing circuit coupled between the compensator circuit and the unregulated isolated DC/DC converter and configured to add the compensated signal to a second reference signal and provide a resulting control signal to the unregulated isolated DC/DC converter.

6. The system of claim 5, wherein the unregulated isolated DC/DC converter is configured to utilize the resulting control signal to modulate a duty cycle or switching frequency of the unregulated isolated DC/DC converter to reduce an amount of low frequency ripple transferred to the output signal from the input signal.

* * * * *